Figure 1:
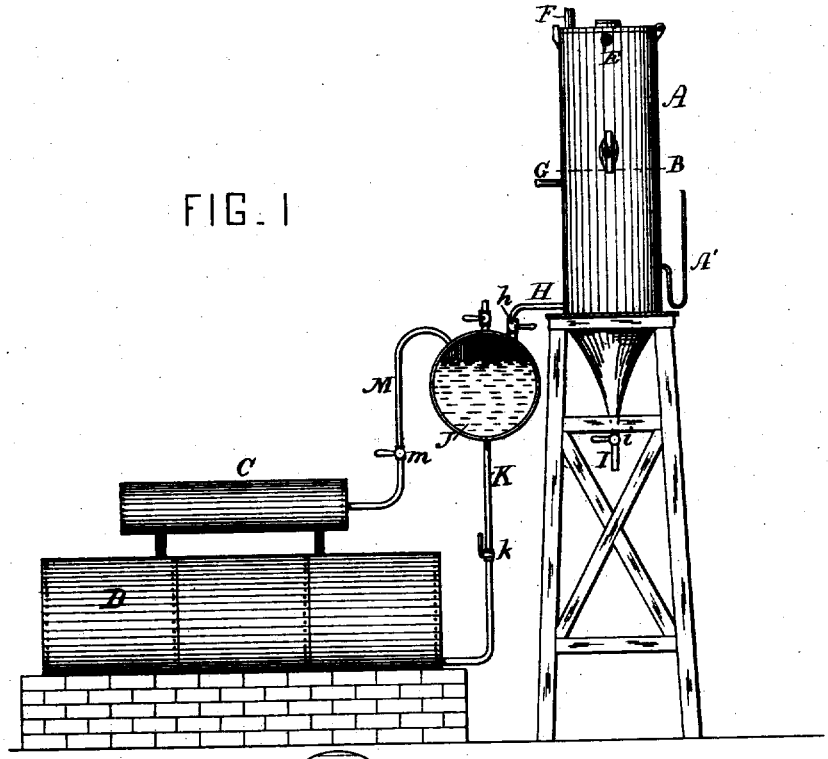

R. LLEWELLYN,

Assignor to LLEWELLYN STEAM CONDENSER MANUFACTURING CO.

FEED WATER HEATER AND CONDENSER FOR STEAM BOILERS.

No. 9,840. Reissued Aug. 16, 1881.

Witnesses
Frank Middleton
David H. Mead

Inventor
Reese Llewellyn
By Elias Spear
Atty

N. PETERS, Photo-Lithographer, Washington, D. C.

UNITED STATES PATENT OFFICE.

REESE LLEWELLYN, OF SAN FRANCISCO, CAL., ASSIGNOR TO LLEWELLYN STEAM CONDENSER MANUFACTURING COMPANY, OF CALIFORNIA.

FEED-WATER HEATER AND CONDENSER FOR STEAM-BOILERS.

SPECIFICATION forming part of Reissued Letters Patent No. 9,840, dated August 16, 1881.

Original No. 218,446, dated August 12, 1879. Application for reissue filed July 19, 1881.

*To all whom it may concern:*

Be it known that I, REESE LLEWELLYN, of the city and county of San Francisco, in the State of California, have invented a certain new and useful Invention or Improvement in Feed-Water Filter Heaters, Purifiers, and Condensers for Steam-Boilers; and I do hereby declare that the following is a full, clear, and exact description of the mode of constructing, applying, and operating the same, reference being had to the accompanying drawings, making part of this specification.

My invention relates to an apparatus for freeing water fed to steam-boilers from earthy matters held in solution therein—such as carbonate and sulphate of lime, magnesia, and the like—and for utilizing at the same time the otherwise waste heat of the exhaust-steam.

It consists, first and essentially, of a chamber provided with a mass of loose stones, preferably cobble-stones, supported in said chamber in such a manner as to permit the free passage of water and steam through and among all the stones, with a pipe in the upper part of said chamber adapted to supply the water in a uniformly-diffused state over the entire mass of stones, and with a steam-supply in the chamber, below the mass of stones, adapted to diffuse in like manner the steam upon the lower surface and cause it to pass up through the mass, whereby the salts and other matters—such as carbonate and sulphate of lime and magnesia and silica held in solution and producing scale in the boiler—are precipitated upon the stones and the heat of the steam utilized.

It consists, in the second place, in injecting the steam horizontally into the lower part of the chamber underneath the stones, whereby it is more uniformly diffused, brought into immediate contact with and caused to penetrate every part of the mass of stones, and approximately to heat all parts alike.

It consists, thirdly, in placing among the stones a layer of filtering material, thereby combining a precipitating and filtering apparatus in one chamber.

It is well known that the water used in many localities for the boilers of steam-engines contains in solution substances—such as carbonate and sulphate of lime, magnesia, silica, and the like—which, when subjected to heat in the boiler, are rendered insoluble, and are deposited upon the inner surface of the boilers and tubes, forming incrustations or "scales." It is also well known that these substances are held in solution only at ordinary temperatures, to become insoluble when the water containing them is raised to a high temperature. It is for this reason that they become deposited as incrustations within the boiler. Attempts have been heretofore made to free the water before it is fed to the boilers of steam-engines from these substances, such attempts having been partially successful. Partial remedy, like that attained prior to my invention, is of little or no avail, for the reason that the incrustation, under such circumstances, still goes on, requiring that the boiler should be watched and cleansed, and it is only by perfect purification of the water in respect to these substances that the need for watchfulness in this respect can be avoided and perfect immunity from incrustation and relief from the danger and expense incident to the formation of scale attained.

Among the devices heretofore provided for this purpose is an apparatus shown in the patent of Fenner, of October 27, 1868, No. 8,337, in which is a chamber filled with fragments of iron resting upon a partially-perforated diaphragm, having a steam-pipe discharging vertically into the chamber below said diaphragm, and with a feed-water pipe adapted to supply water to said chamber above the iron fragments. I have aimed to avoid two defects incident to this apparatus, one consisting in the material used in connection with the steam and water supply, and the other relating to the manner of supplying the steam to the fragments of iron by direct discharge against an unperforated part of the diaphragm.

In the British Patent numbered 2,442 of 1854 is shown also a device in which stones are used with devices for discharging the feed-water mixed with steam over the stones for the purpose of purifying it. In this case the high degree of heat necessary to the perfect condensation of the mass held in solution cannot be attained because the steam is not brought into direct contact with the stones, and in the former case referred to this perfect action is prevented, partly by the oxidizable nature of the material, which is acted upon by the water and prevents perfect incrustation, and partly by the solid portions of the diaphragm, which protect part of the mass from heat.

I have endeavored to avoid all these difficulties, and have succeeded in producing an apparatus which perfectly frees the water from incrusting material and fulfills all the conditions required. This is shown in the accompanying drawings, in which—

Figure 2:
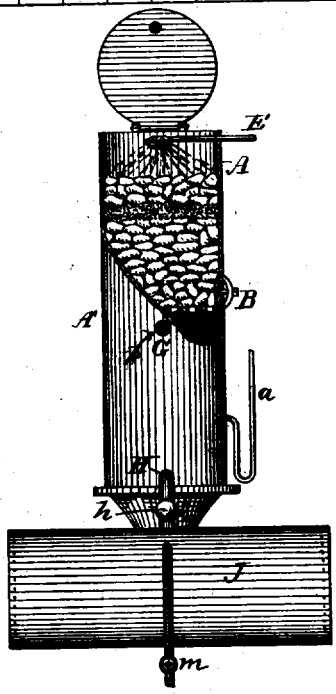
Figure 3:
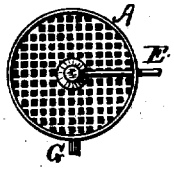

Figure 1 represents a side elevation; Fig. 2, a front view of the apparatus with a portion of the shell of the chamber broken away; and Fig. 3, a plan view of the purifying, heating, and condensing chamber.

In these drawings, A A′ represent the heating, purifying, and condensing chamber; B, the perforated diaphragm; C, the steam-chamber of the boiler, and D the boiler.

The chamber A A′ is fitted with a tight cover, and has in the top a pipe, E, for admitting the feed-water, and an outlet steam-pipe, F, for the escape of uncondensed steam. The lower portion, A′, of the chamber which receives the hot water has a steam-inlet pipe, G, and a hot-water outlet-pipe, H, with a discharge-pipe, I, at the bottom for removing any sediment. This apparatus is placed in any convenient position in relation to the boiler, and the steam from the engine-cylinders is let into the chamber through the horizontal pipe G, just beneath the perforated diaphragm, while the hot water is drawn off through the pipe H and let into the boiler. Within the chamber A A′ is placed a quantity of cobble-stones or other bodies of like nature, of irregular shape, and with interstices throughout it, through which interstices the steam and water may pass freely. The upper chamber contains also a layer of coke, charcoal, or other filtering substances placed within it.

In connection with this condensing, purifying, and heating chamber, I employ means for supplying water to the boiler without the use of a pump, consisting of a drum or hot-water reservoir, J, placed between the chamber and the boiler and connected with both by the water-pipes K H. From the steam-space of chamber C a steam-pipe, M, admits steam under pressure within the upper part of the drum upon the hot water. Thus by shutting the cock *h* in the water-pipe H, and then opening the steam and water cocks *k m* in the pipes K M, respectively, the pressure will force the hot water into the boiler, thus feeding the water without pumping.

The chamber A A′ is to be provided with the necessary water-level tubes, gage-cock, man-holes, &c., for the proper operation of the apparatus, and to facilitate removing of the cobble-stones for the purpose of cleaning or to free the diaphragm from any incrustation which may have accumulated upon it. The bottom of the lower chamber has a discharge-pipe, I, to permit the withdrawal of any sediment.

In the operation of my apparatus exhaust-steam is introduced through the horizontal pipe G into the lower chamber, and by reason of its horizontal direction it is uniformly diffused, and, passing freely through the open bottom or diaphragm upon which the cobble-stones rest, acts immediately and uniformly upon the mass, imparting to it directly its heat. By reason of the interstices between these irregular cobble-stones it may pass freely up, heating the whole mass as it rises, maintaining the mass at a high temperature, and thence passing into the upper chamber, where it meets the feed-water showered from above. The feed-water receives from the steam its first increment of heat, and then falls upon the heated stones, which, by their high temperature, raise the water to a point where the incrusting material contained therein becomes insoluble, and is deposited upon the surface of the stones, where it incrusts. As the water passes down through the interstices of the mass all parts of it are exposed to the action of the stones by reason of the water passing in thin films through the said interstices and over the surfaces of the stones. As the stones are heated from the bottom, their action becomes more effective upon the water as it progresses downward.

The effect of this apparatus is manifestly twofold, as it at the same time frees the water from the materials which would form incrustations in the boiler and imparts to it the heat of the exhaust-steam, which would otherwise be wasted. Incidentally, also, it condenses part of the exhaust-steam and returns it to the boiler with the feed-water; but the main effect is that the hard, insoluble heat-retaining surfaces of the stones, raised by the direct application of the steam to a high degree of heat, act instantly upon the thin films of water as they pass over said surfaces.

Desiring to be understood as admitting that the elements, so far as specified above, in the patents referred to are not new or of my invention, I make no claim thereto, and limit myself to the organization specified made up of elements necessary to secure the perfect action of the steam of the heating-surfaces and of the water.

What I do claim is—

1. An apparatus for purifying and heating feed-water, consisting of a chamber provided with a mass of stones, preferably cobble-stones, supported on an open or wholly perforated diaphragm or grating, in combination with a feed-water pipe adapted to spray water on the upper surface of the mass of stones, and a steam-supply pipe in the lower part of the chamber, adapted to supply steam in a diffused state directly to the lower surface of the mass, as set forth.

2. In combination with the chamber having the stones in mass, the open diaphragm, and the water-supply pipe, a steam-supply pipe adapted to discharge horizontally beneath said diaphragm, as set forth.

3. The combination, in one vessel or apparatus, of the condensing and filtering chamber A, having a perforated diaphragm, B, the water-spraying pipe E, the feed-water-receiving chamber J, having the exhaust-steam inlet G located in the side thereof, and the boiler D and pipe K, arranged as shown, and for the purpose described.

4. In a heater and purifier for steam-boilers, the vessel A A′, having a removable or hinged top and steam-outlet, a water-jet arranged within the vessel and under said top, a mass of cobble-stones arranged under said jet and resting upon a diaphragm wholly perforated, an exhaust-steam inlet-pipe, G, entering horizontally below said diaphragm, and a funnel-bottomed chamber for the collection of any escaping sediment, all combined and arranged for joint operation in the manner shown and set forth.

In testimony that I claim the foregoing I have hereunto set my hand this 29th day of June, 1881.

REESE LLEWELLYN.

Witnesses:

ANDREW I. COFFEE,

E. H. WOODBRIDGE